(12) United States Patent
Khorram

(10) Patent No.: US 7,583,212 B2
(45) Date of Patent: *Sep. 1, 2009

(54) REDUCED NOISE RADIO FREQUENCY INTEGRATED CIRCUIT

(75) Inventor: Shahla Khorram, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/876,626

(22) Filed: Oct. 22, 2007

(65) Prior Publication Data

US 2008/0036636 A1    Feb. 14, 2008

Related U.S. Application Data

(63) Continuation of application No. 10/742,374, filed on Dec. 19, 2003, now Pat. No. 7,305,222.

(51) Int. Cl.
*H03M 1/00*     (2006.01)
(52) U.S. Cl. .................. 341/126; 455/333; 361/600; 327/551
(58) Field of Classification Search ......... 341/120–140; 455/295, 296, 333; 361/600, 679, 728, 736; 327/551, 552, 564
See application file for complete search history.

(56) References Cited

U.S. PATENT DOCUMENTS

| 6,040,728 | A  | * | 3/2000  | Nelson et al. | 327/292 |
| 6,639,509 | B1 | * | 10/2003 | Martinez      | 340/10.4 |
| 7,099,648 | B2 | * | 8/2006  | Khorram       | 455/333 |
| 7,305,222 | B2 | * | 12/2007 | Khorram       | 455/333 |

* cited by examiner

*Primary Examiner*—Lam T Mai
(74) *Attorney, Agent, or Firm*—Garlick Harrison & Markison; Bruce E. Stuckman

(57) ABSTRACT

A radio frequency integrated circuit (RFIC) includes a digital to analog converter, an analog to digital converter, and a low noise amplifier. The digital to analog converter (DAC) is operably coupled to convert outbound symbols into outbound baseband signals, wherein the digital to analog converter is fabricated within a DAC portion of a substrate of the RFIC. The analog to digital converter (ADC) is operably coupled to convert inbound baseband signals into inbound symbols, wherein the analog to digital converter is fabricated within an ADC portion of the substrate. The low noise amplifier is operably coupled to amplify an inbound radio frequency (RF) signals. The low noise amplifier is fabricated within a radio portion of the substrate, wherein the DAC portion of the substrate is physically between the ADC portion and the radio portion of the substrate to provide isolation when the low noise amplifier and the ADC are active and the DAC is inactive.

15 Claims, 5 Drawing Sheets

RFIC layout

FIG. 4 - RFIC packaging

REDUCED NOISE RADIO FREQUENCY INTEGRATED CIRCUIT

This patent application is claiming priority under 35 USC § 120 as a continuing patent application of co-pending patent application entitled RADIO FREQUENCY INTEGRATED CIRCUIT HAVING REDUCED RECEIVER NOISE LEVELS, having a filing date of Dec. 19, 2003, and a Ser. No. 10/742,374.

BACKGROUND OF THE INVENTION

1. Technical Field of the Invention

This invention relates generally to wireless communication systems and more particularly to radio frequency integrated circuits used within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

When the radio transceiver is implemented on a single integrated circuit, noise from the digital circuitry (e.g., the analog to digital converters, the digital to analog converters, the data recovery stage, the data modulation stage, etc.) can adversely affect the performance of the analog radio front-end (e.g., the low noise amplifier, the intermediate frequency stages, etc.). Accordingly, conventional IC layout practices are employed, which include separate power supplies for the analog and digital sections, separate ground connections for the analog and digital sections, and minimizing high frequency analog traces.

While these conventional IC layout practices help reduce the noise coupled from the digital section to the analog section, for high performance RF transceivers, the adverse affects of the noise from the digital section on the analog section is still too great. For instance, IEEE 802.11, in at least one subparagraph, requires a signal to noise (SNR) of −85 dBm when data is being transmitting at an 11 MPBS (megabits per second) rate. With this requirement, a 1-volt input signal must have less than approximately 20 micro-volts of noise. Without further noise suppressing techniques, the conventional IC layout practices fail to provide sufficient noise suppression and/or isolation.

Therefore a need exists for an integrated circuit, and in particular a radio frequency integrated circuit (RFIC), that has a high level of noise immunity between its analog sections and digital sections.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
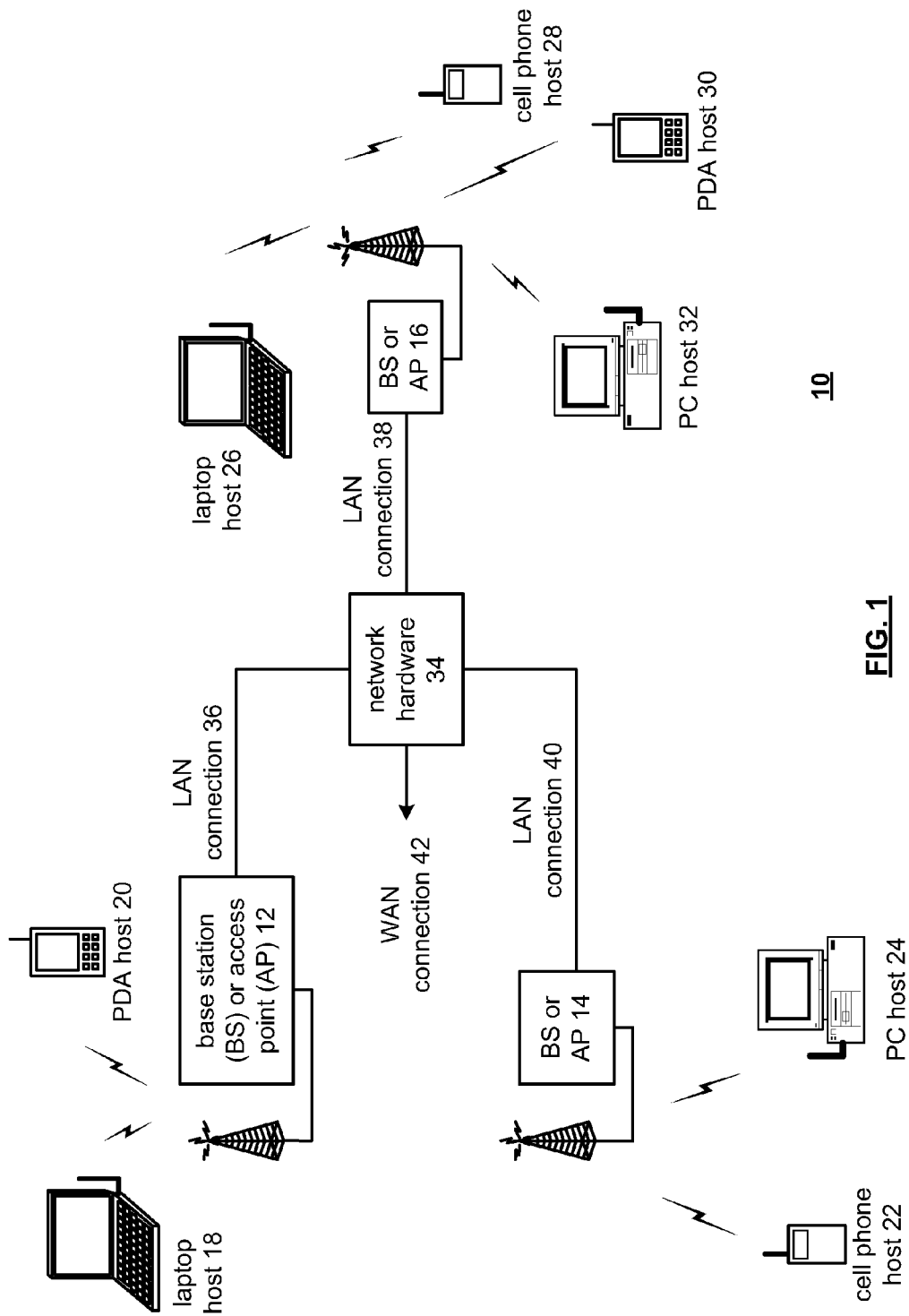
FIG. 1 is a schematic block diagram of a wireless communication system in accordance with an embodiment of the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
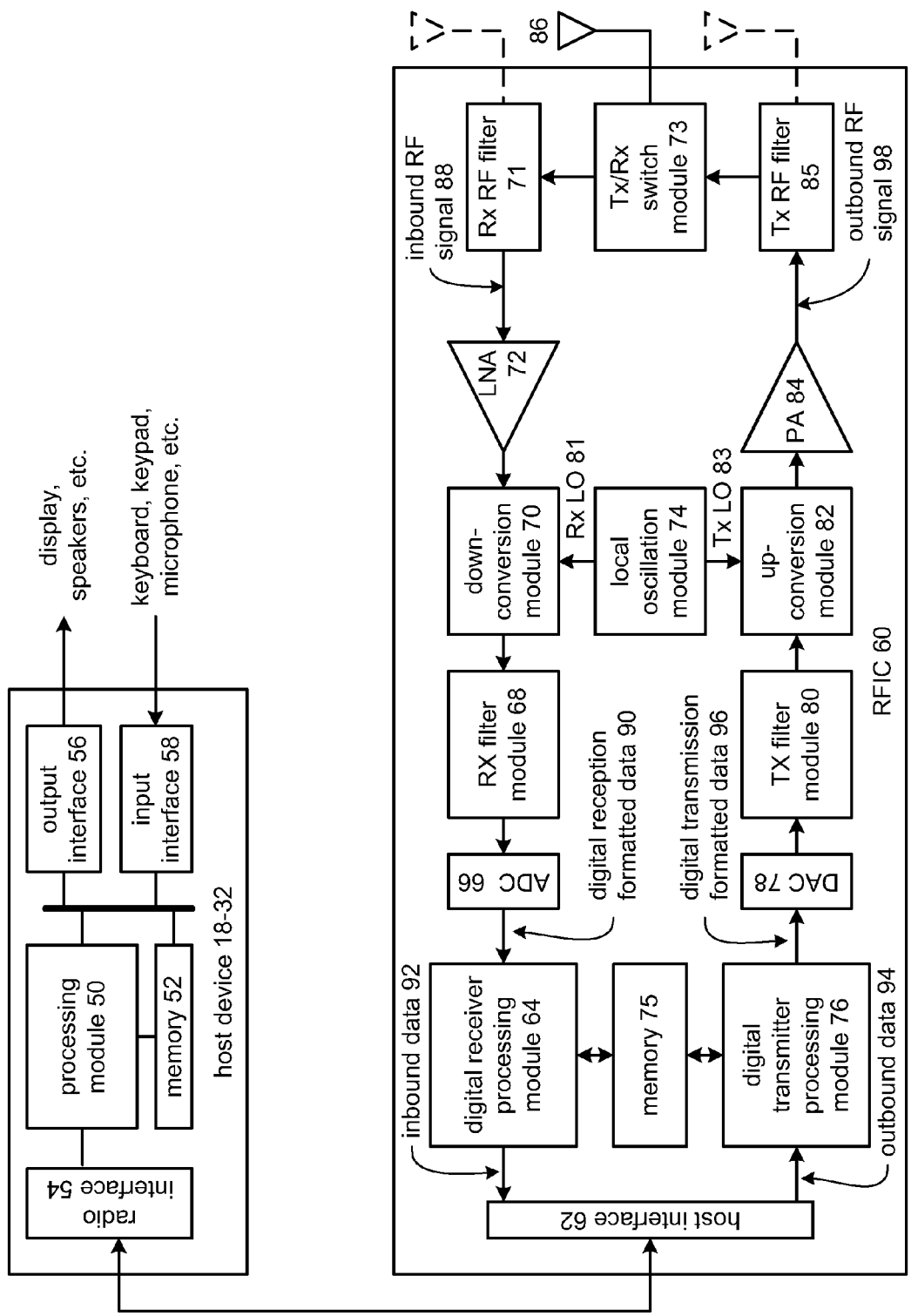
FIG. 2 is a schematic block diagram of a wireless communication device is accordance with an embodiment of the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a receive (RX) filter module 68, an IF mixing down conversion stage 70, an RX RF filter 71, a low noise amplifier 72, a transmitter/receiver switch 73, a local oscillation module 74, memory 75, a digital transmitter processing module 76, a digital-to-analog converter 78, a transmit (TX) filter module 80, an IF mixing up conversion stage 82, a power amplifier 84, a TX RF filter 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively, in accordance with an encoding protocol proscribed by the corresponding standard. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The TX filter 80 filters the analog signal prior to providing it to the IF up conversion mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the TX RF filter 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the RX RF filter 71 via the Tx/Rx switch 73, where the RX RF filter 71 bandpass filters the inbound RF signal 88 and provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the RX filter module 68. The RX filter module 68 filters the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
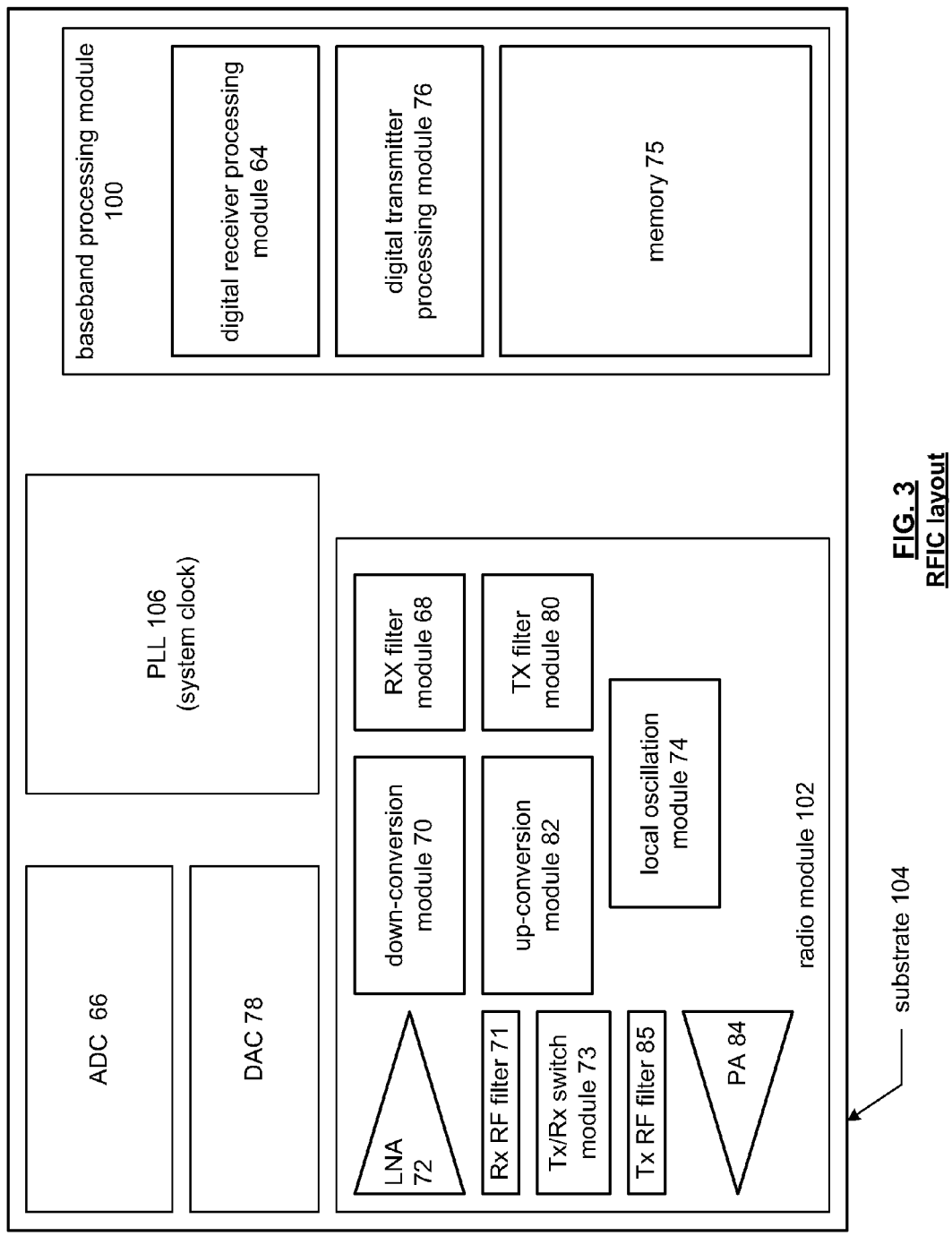
FIG. 3 is a diagram of a radio frequency integrated circuit layout in accordance with an embodiment of the present invention.

FIG. 3 is a diagram of a radio frequency integrated circuit (RFIC) layout. The RFIC is fabricated on a substrate 104, which may be produced using CMOS Technology, Silicon Germanium Technology, Gallium Arsenide Technology, et cetera. The substrate 104 supports a radio module 102, a baseband processing module 100, a phase locked loop (PLL) 106, the analog-to-digital converter 66, and the digital-to-analog converter 78. The baseband processing module 100 includes the digital receiver processing module 64, the digital transmitter processing module 76, and memory 75. The radio module 102 includes the low noise amplifier 72, the down-conversion module 70, receiver filter module 68, the local oscillation module 74, the receiver RF filter module 71, the transmit/receive switch module 73, the transmit RF filter module 85, power amplifier 84, up-conversion module 82, and the transmit filter module 80.

The RFIC, when in use, communicates in a half duplex manner. In other words, when the RFIC is transmitting data the receiver section (e.g., low noise amplifier 72, down-conversion module 70, receiver filter module 68, analog-to-digital converter 66) is inactive. When in the receive mode, the transmitter section (the power amplifier 84, transmit RF filter module 85, up-conversion module 82, transmit filter module 80 and digital-to-analog converter 78) is inactive. To provide improved noise immunity for the receiver section from digital noise produced by the analog-to-digital converter 66, the placement of the analog-to-digital converter 66 on substrate 104 is physically separated from the receiver section of radio module 102, by the digital-to-analog converter 78. With the digital-to-analog converter 78 being inactive when the receiver section is active, it provides a very low noise physical barrier between the receiver portion of the radio module 102 and the analog to digital converter 66. As such, the coupling of the noise created by the analog-to-digital converter 66 to the low noise amplifier 72 is decreased, which improves the signal-to-noise ratio of received RF signals.

Figure 4:
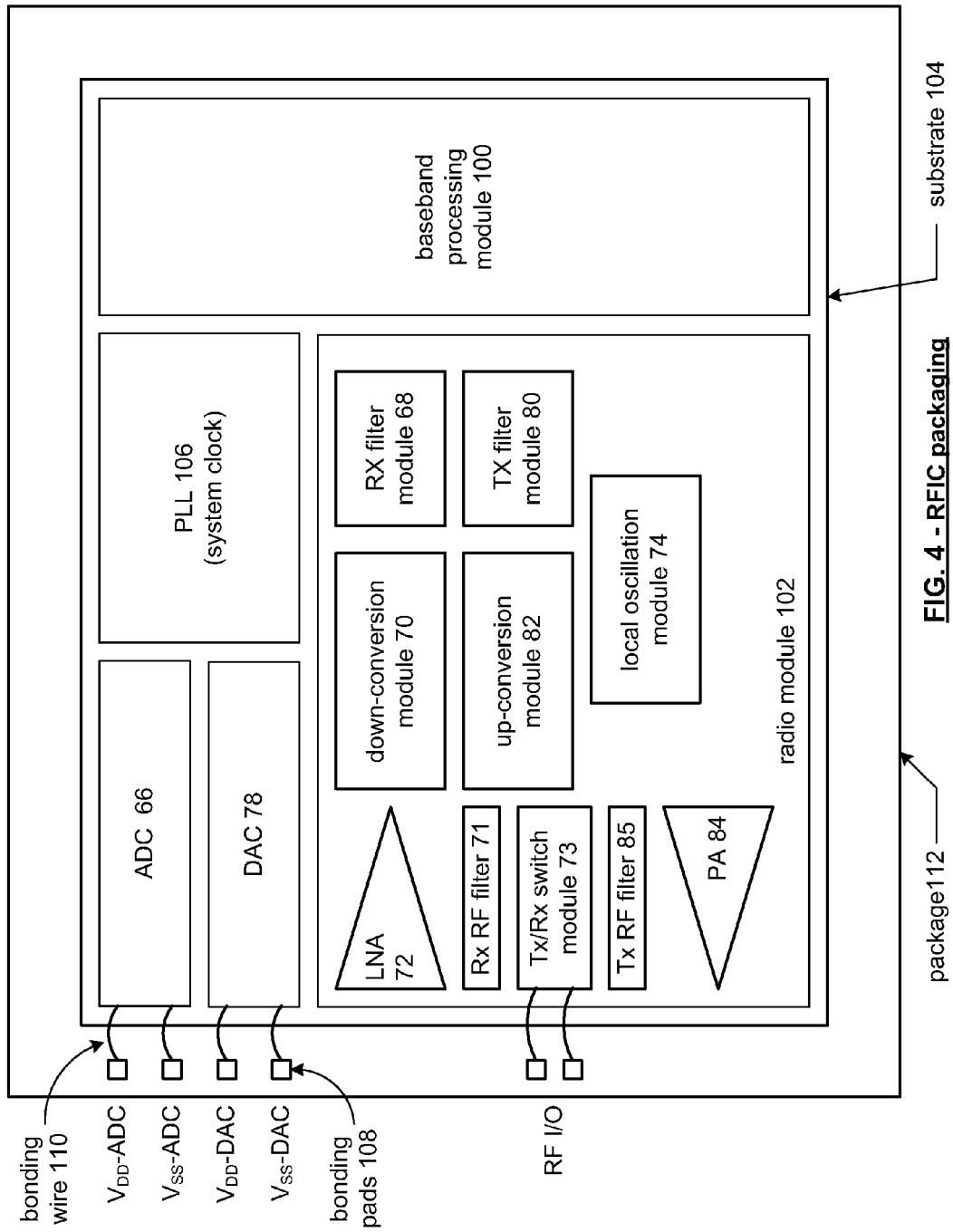
FIG. 4 is a diagram of a radio frequency integrated circuit packaging in accordance with an embodiment of the present invention.

FIG. 4 is a diagram illustrating radio frequency integrated circuit (RFIC) packaging. In this diagram, a package 112 supports the substrate 104. The package 112 includes a plurality of bonding pads 108 and bonding wires 110. As shown, the radio frequency input/output bonding pads are coupled via bonding wires to the transmit/receive switch module 73. Traces within the radio module 102 couple the RF input/output signals to the receiver RF filter 71 and the transmit RF filter 85, respectively.

The digital-to-analog converter and analog-to-digital converter each have separate power supply connections ($V_{DD}$ and $V_{SS}$). As shown, the physical separation between the RF input/output bonding pads is increased by having the analog-to-digital converter 66 separated from the RF module 102 by the digital-to-analog converter 78. Since the digital-to-analog converter 78 is inactive, thus producing negligible noise, while the receiver section is active, the increased distance between the analog-to-digital converter and the low noise amplifier 72 of the receiver section is increased. The increase of physical separation decreases the noise coupling of the noise produced by the ADC 66 to the LNA 72, which improves signal-to-noise ratio performance of the receiver section of the RFIC.

Figure 5:
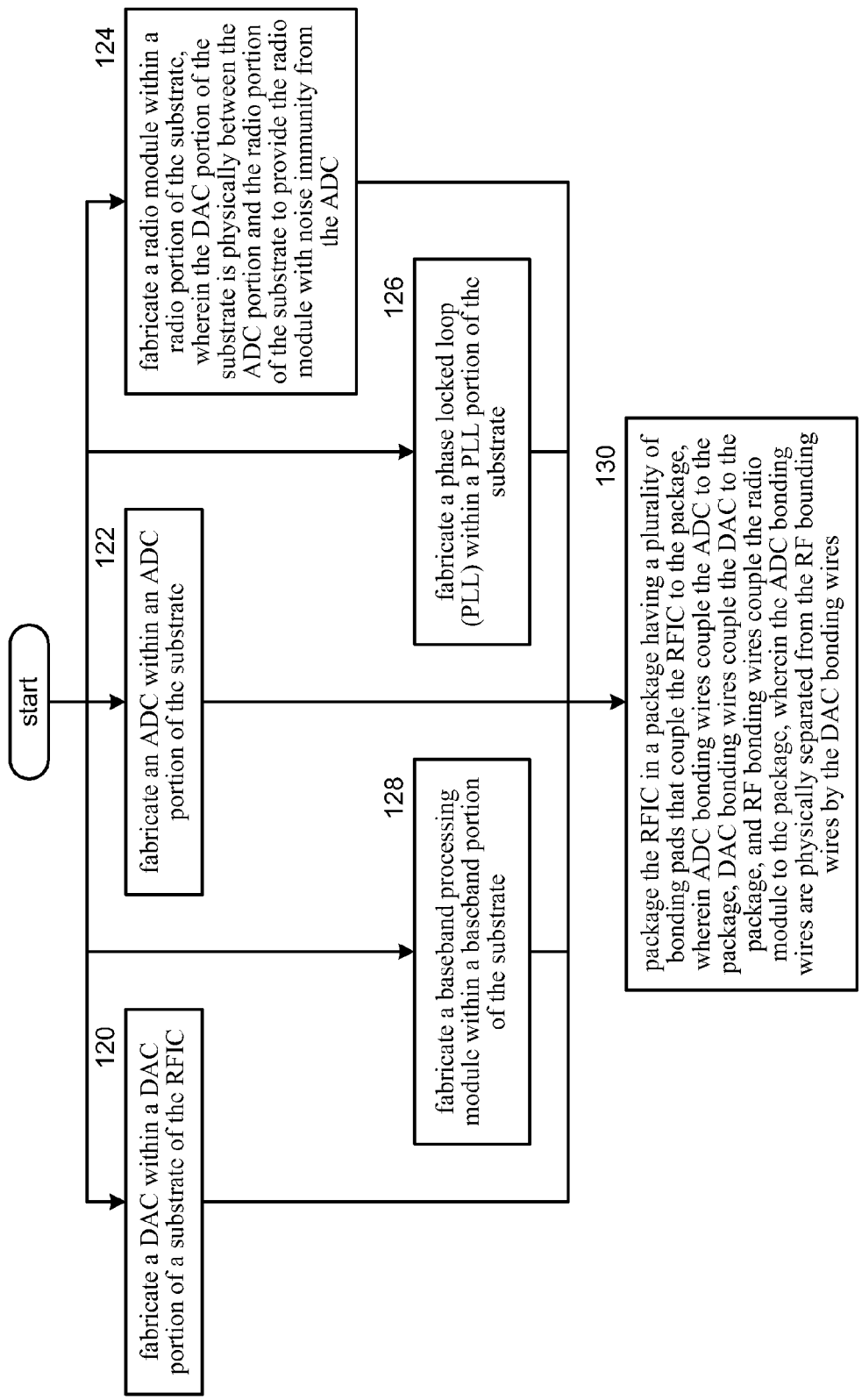
FIG. 5 is a logic diagram of a method for fabricating a radio frequency integrated circuit in accordance with the present invention.

FIG. 5 is a logic diagram of a method for fabricating a radio frequency integrated circuit with improved noise performance. The process begins simultaneously at Steps 120-128. At Step 120, a digital-to-analog converter is fabricated within a digital-to-analog converter portion of a substrate of a radio frequency integrated circuit. At Step 122, an analog-to-digital converter is fabricated with an analog-to-digital converter portion of the substrate. At Step 124, a radio module is fabricated within a radio portion of the substrate, wherein the digital-to-analog converter portion of the substrate is physically between the analog-to-digital converter portion and the radio portion of the substrate. This provides the radio module with enhanced noise immunity with respect to the analog-to-digital converter. Note that the radio module includes one or more of the elements shown in FIGS. 3 and/or 4.

At Step 126, a phase locked loop (PLL) is fabricated within a PLL portion of the substrate. At Step 128, a baseband processing module is fabricated within a baseband portion of the substrate. The processing then proceeds to Step 130 where the RFIC is packaged in a package having a plurality of bonding pads. The bonding pads couple the RFIC to the package. Analog-to-digital converter bonding pads couple the analog-to-digital converter to the package, digital-to-analog converter bonding wires couple the digital-to-analog converter to the package, and RF bonding wires couple the radio module to the package. The analog-to-digital converter bonding wires are physically separated from the RF bonding wires by the digital-to-analog converter bonding wires.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a radio frequency integrated circuit having improved signal-to-noise ratio performance and/or improved noise suppression within the receiver portion. As one of average skill in the art will appreciate, other embodiments may be derived from the teaching of the present invention without deviating from the scope of the claims.

What is claimed is:

1. A radio frequency integrated circuit (RFIC) comprises:
a low noise amplifier coupled to amplify an inbound radio frequency (RF) signal to produce an amplified inbound RF signal, wherein the low noise amplifier is fabricated within a radio portion of a substrate of the RFIC;
a digital to analog converter (DAC) operably coupled to convert outbound symbols into outbound baseband signals, wherein the digital to analog converter is fabricated within a DAC portion of the substrate of the RFIC; and
an analog to digital converter (ADC) operably coupled to convert inbound baseband signals into inbound symbols, wherein the ADC is fabricated within a ADC portion of the substrate, wherein the DAC portion of the substrate is physically between the ADC portion and the radio portion of the substrate to provide isolation when the low noise amplifier and the ADC are active and the DAC is inactive.

2. The RFIC of claim 1 further comprises:
a baseband processing module operable to convert outbound data into the outbound symbols based on an encoding protocol and to convert the inbound symbols into inbound data based on the encoding protocol, wherein the baseband processing module is fabricated within a baseband portion of the substrate.

3. The RFIC of claim 1 further comprises:
a package having a plurality of bonding pads that couple the RFIC to the package, wherein ADC bonding wires of the plurality of bonding wires couple the ADC to the package, DAC bonding wires of the plurality of bonding wires couple the DAC to the package, and RF bonding wires of the plurality of bonding wires couple the low noise amplifier to the package, wherein the ADC bonding wires are physically separated from the RF bounding wires by the DAC bonding wires.

4. The RFIC of claim 1 further comprises:
a phase locked loop (PLL) operably coupled to produce a system clock for the DAC and the ADC, wherein the phased locked loop is fabricated on a PLL portion of the substrate and is physically separated from the radio portion.

5. The RFIC of claim 1 further comprises:
down conversion module operably coupled to convert the amplified inbound RF signals into inbound baseband signals based on a receive local oscillation, wherein the down conversion module is fabricated in a down conversion section of the radio portion of the substrate.

6. A radio frequency integrated circuit (RFIC) comprises:
a low noise amplifier coupled to amplify an inbound radio frequency (RF) signal to produce an amplified inbound RF signal, wherein the low noise amplifier is fabricated within a radio portion of a substrate of the RFIC;
a digital to analog converter (DAC) operably coupled to convert outbound symbols into outbound baseband signals, wherein the DAC is fabricated within a DAC portion of the substrate of the RFIC; and
an analog to digital converter (ADC) operably coupled to convert inbound baseband signals into inbound symbols, wherein the ADC is fabricated within an ADC portion of the substrate, and wherein the DAC portion of the substrate is physically positioned to provide a low noise physical barrier between the receiver portion of the substrate and the ADC portion of the substrate.

7. The RFIC of claim 6 further comprises:
a baseband processing module operable to convert outbound data into the outbound symbols based on an encoding protocol and to convert the inbound symbols into inbound data based on the encoding protocol, wherein the baseband processing module is fabricated within a baseband portion of the substrate.

8. The RFIC of claim 6 further comprises:
a package having a plurality of bonding pads that couple the RFIC to the package, wherein ADC bonding wires of the plurality of bonding wires couple the ADC to the package, DAC bonding wires of the plurality of bonding wires couple the DAC to the package, and RF bonding wires of the plurality of bonding wires couple the low noise amplifier to the package, wherein the ADC bonding wires are physically separated from the RF bounding wires by the DAC bonding wires.

9. The RFIC of claim 6 further comprises:
a phase locked loop (PLL) operably coupled to produce a system clock for the DAC and the ADC, wherein the phased locked loop is fabricated on a PLL portion of the substrate and is physically separated from the radio portion.

10. The RFIC of claim 6 further comprises:
down conversion module operably coupled to convert the amplified inbound RF signals into inbound baseband signals based on a receive local oscillation, wherein the down conversion module is fabricated in a down conversion section of the radio portion of the substrate.

11. A radio frequency integrated circuit (RFIC) comprises:
a low noise amplifier coupled to amplify an inbound radio frequency (RF) signal to produce an amplified inbound RF signal, wherein the low noise amplifier is fabricated within a radio portion of a substrate of the RFIC;

a digital to analog converter (DAC) operably coupled to convert outbound symbols into outbound baseband signals, wherein the DAC is fabricated within a DAC portion of the substrate of the RFIC; and an analog to digital converter (ADC) operably coupled to convert inbound baseband signals into inbound symbols, wherein the ADC is fabricated within an ADC portion of the substrate, wherein the DAC portion of the substrate is physically between the ADC portion and the radio portion of the substrate, and wherein the ADC and the DAC have separate power supply connections.

12. The RFIC of claim 11 further comprises:

a baseband processing module operable to convert outbound data into the outbound symbols based on an encoding protocol and to convert the inbound symbols into inbound data based on the encoding protocol, wherein the baseband processing module is fabricated within a baseband portion of the substrate.

13. The RFIC of claim 11 further comprises:

a package having a plurality of bonding pads that couple the RFIC to the package, wherein ADC bonding wires of the plurality of bonding wires couple the ADC to the package, DAC bonding wires of the plurality of bonding wires couple the DAC to the package, and RF bonding wires of the plurality of bonding wires couple the low noise amplifier to the package, wherein the ADC bonding wires are physically separated from the RF bounding wires by the DAC bonding wires.

14. The RFIC of claim 11 further comprises:

a phase locked loop (PLL) operably coupled to produce a system clock for the DAC and the ADC, wherein the phased locked loop is fabricated on a PLL portion of the substrate and is physically separated from the radio portion.

15. The RFIC of claim 11 further comprises:

down conversion module operably coupled to convert the amplified inbound RF signals into inbound baseband signals based on a receive local oscillation, wherein the down conversion module is fabricated in a down conversion section of the radio portion of the substrate.

* * * * *